United States Patent [19]

Cunningham

[11] Patent Number: 4,655,468
[45] Date of Patent: Apr. 7, 1987

[54] SPRAY DEFLECTORS FOR VEHICLES

[75] Inventor: Douglas J. Cunningham, Portsmouth, England

[73] Assignee: BSG International Plc., Birmingham, England

[21] Appl. No.: 839,116

[22] Filed: Mar. 12, 1986

[30] Foreign Application Priority Data

Mar. 26, 1985 [GB] United Kingdom ............... 8507895

[51] Int. Cl.$^4$ ............................................. B62D 25/16
[52] U.S. Cl. ............................................. 280/154.5 R
[58] Field of Search .......... 280/152 R, 152 A, 153 A, 280/154.5 R, 153 R, 159

[56] References Cited

U.S. PATENT DOCUMENTS

| 3,869,617 | 3/1975 | Gaussion et al. | 280/154.5 R |
| 3,922,003 | 11/1975 | Lea | 280/154.5 R |
| 4,205,861 | 6/1980 | Roberts et al. | 280/154.5 R |

Primary Examiner—John J. Love
Assistant Examiner—Richard Lamby
Attorney, Agent, or Firm—Hayes, Davis & Soloway

[57] ABSTRACT

Apparatus for reducing the amount of water spray produced by a wheel of a motor vehicle comprises a mudguard extending round an upper part of the wheel and a water collection chamber abutting the rear bottom edge of the mudguard and having an open front wider than the edge of the wheel, a rear wall having its outboard edge nearer to the front of the vehicle than its inboard edge and an outlet inboard of the inboard edge of the wheel.

11 Claims, 3 Drawing Figures

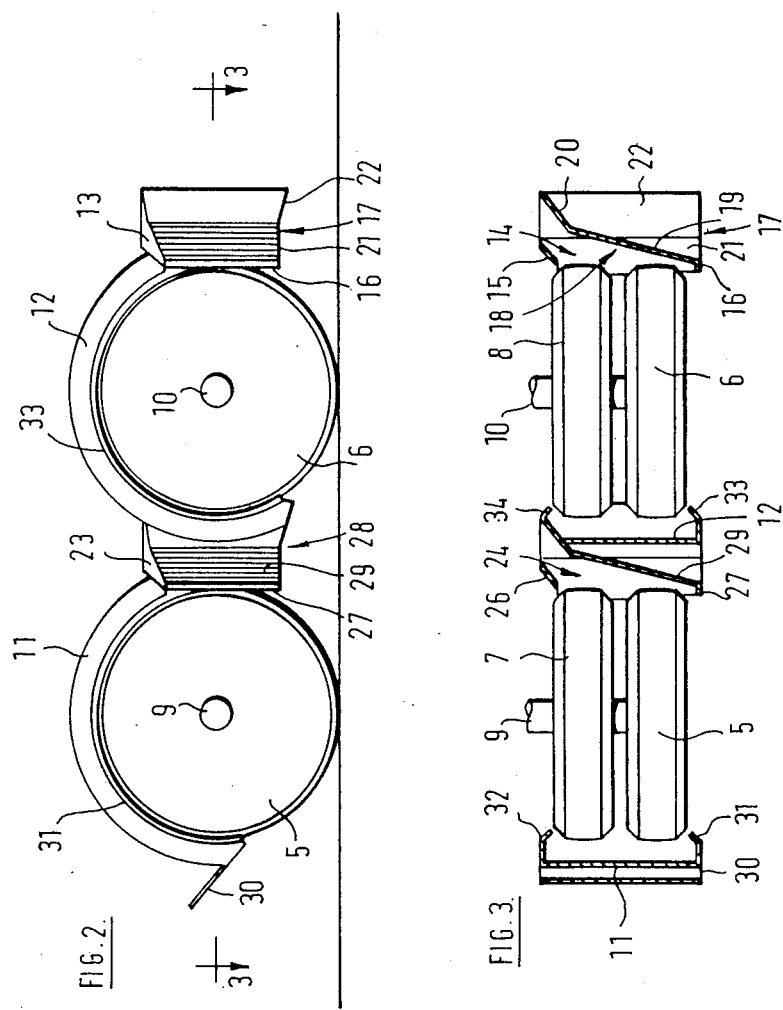

SPRAY DEFLECTORS FOR VEHICLES

This invention relates to apparatus for reducing the amount of water spray produced by the wheels of motor vehicles when running on wet surfaces.

According to the invention, apparatus for reducing the amount of water spray produced by a wheel of a motor vehicle comprises a mudguard extending round an upper part of the wheel and a water collection chamber abutting the rear bottom edge of the mudguard and having an open front wider than the edge of the wheel, a rear wall having its outboard edge nearer to the front of the vehicle than its inboard edge and an outlet inboard of the inboard edge of the wheel.

A deflector plate may be secured to the front of the mudguard with its front edge above its rear edge and in front of the mudguard. Preferably, the rear edge of the deflector plate is closer to the wheel than is the adjacent part of the mudguard.

When the invention is used with a vehicle having more than one wheel on each end of each axle, a single mudguard and collection chamber may be provided for each end of such axle.

An embodiment of the invention will now be described with reference to the accompanying drawings, in which:

FIG. 2 is a side view, on an enlarged scale, of the rear wheels of the vehicle shown in FIG. 1; and FIG. 3 is a sectional view taken on the line 3—3 in FIG. 2.

Figure 1:
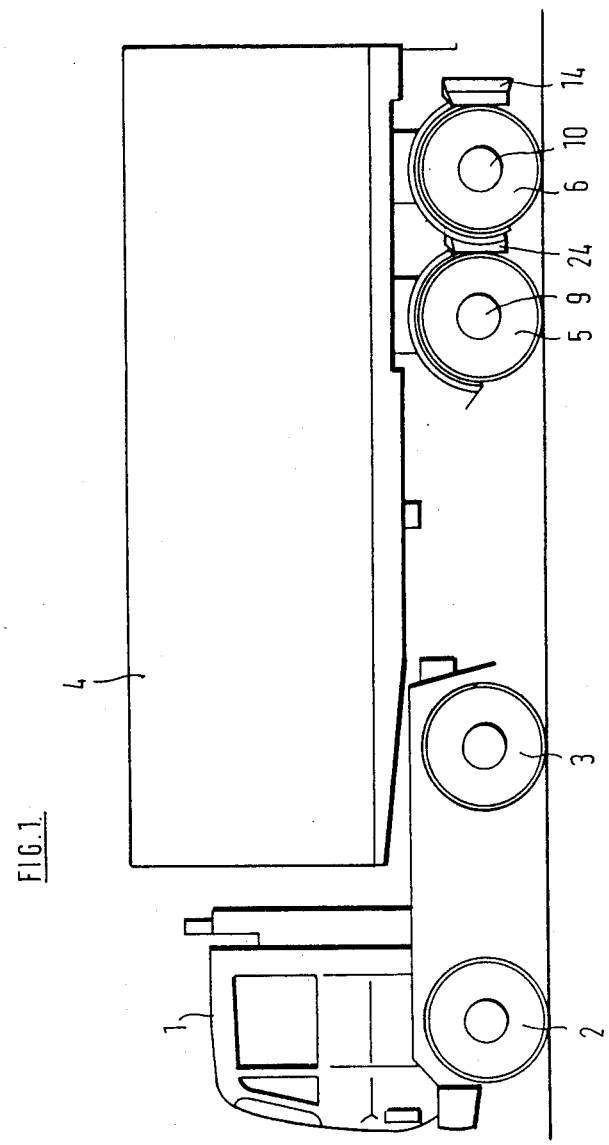
FIG. 1 is a side view of an articulated commercial vehicle fitted with apparatus in accordance with the invention.

Referring first to FIG. 1, an articulated commercial vehicle comprises a tractor 1, having front wheels 2 and rear wheels 3, and a trailer 4, having front wheels 5 and rear wheels 6.

Turning to FIGS. 2 and 3, there are inner wheels 7 and 8 on the same axles 9 and 10 as the rear wheel 5 and 6 respectively. A mudguard extends round the upper part of the periphery of the front wheels 5 and 7 of the trailer and a similar mudguard 12 extends round the upper part of the periphery of the rear wheels 6 and 8. The rear edge of the rear mudguard 12 is above the level of the axle 10 and is attached to the top wall 13 of a water collection chamber 14.

The water collection chamber 14 also has an inboard side wall 15, an outboard side wall 16 extending parallel to the longitudinal axis of the vehicle, a bottom wall 17 and an oblique rear wall 18. The oblique rear wall 18 has a main portion 19 and an inboard portion 20. The main portion 19 extends from the rear edge of the outboard side wall 16 inwardly and backwardly to a location behind the inner rear wheel 8 where it joins the inboard portion 20. The inboard portion 20 runs inwardly and backwardly to the inboard rear corners of the top wall 13 and bottom wall 17. The inboard portion 20 is oriented at a greater angle to the outboard side wall 16 than is the main portion 19.

The inboard side wall 15 extends from the front of the top wall 13 and bottom wall 17 rearwardly and inwardly at an angle between that of the main portion 19 of the rear wall 18 and the inboard portion 20 thereof so as to form an outlet between its rear edge and the inboard edge of the rear wall portion 20 which is wider than the distance between the front edge of the inboard side wall 15 and the junction between the two portions 19 and 20 of the rear wall 18. The inboard edge of the top wall 13 is higher than its outboard edge. The bottom wall 17 is formed in two sections, the front section 21 being horizontal and the rear section 22 sloping downwardly from the front section 21.

Similarly, the rear edge of the front mudguard 11 is above the front axle 9 and is attached to the top wall 23 of a water collection chamber 24 which also has an inboard side wall 26, an outboard side wall 27 extending parallel to the longitudinal axis of the vehicle, a bottom wall 28 and an oblique rear wall 29, all of equivalent shape to the corresponding chamber of the water collection chamber 15.

The front edge of the front mudguard 11 carries a sloping deflector plate 30, the front edge of which is higher than its rear edge. The deflector plate 30 serves to separate water droplets carried over the tops of the wheels 5 and 7 from the flow of air due to movement of the vehicle, which may carry droplets of water produced by the wheels of the tractor. Rubber flaps 31 and 32 are attached to the outboard and inboard edges of the mudguard 11 respectively and extend from the deflector plate 30 to the top wall 23 of the front water collection chamber 24, thus preventing any droplets of water which are carried above such water collection chamber 24 from escaping laterally. Such droplets are carried over to the top of deflector plate 30 and drip off the rear edge thereof. Similar rubber flaps 33 and 34 are attached to the inboard and outboard edges of the rear mudguard 12, the function of the deflector plate 30 being performed by the bottom plate 28 of the front water collection chamber 15.

The front and rear wheels 2 and 3 of the tractor may be provided with apparatus in accordance with the invention consisting of the front half of the apparatus fited to the front trailer wheels 5 and 7 and the rear half of the apparatus fitted to the rear trailer wheels 6 and 8. The lateral movement of the steered wheels 2 may be accommodated if the apparatus is as wide as that illustrated in FIGS. 2 and 3, i.e. is wide enough to accommodate two non-steered wheels.

It will be apparent to those skilled in the art that the invention can readily be applied to three-axle trailers and also to vehicles with rigid bodies.

I claim:

1. Apparatus for reducing the amount of water spray produced by a wheel of a motor vehicle, comprising a mudguard extending round an upper part of the wheel, and a water collection chamber abutting the rear bottom edge of the mudguard and having an open front wider thaan the edge of the wheel, a rear wall having its outboard edge nearer to the front of the vehicle than its inboard edge, and an outlet located at the inboard side of the chamber inboard of the inboard edge of the wheel, a first portion of the rear wall bounding the rear edge of the outlet and the chamber having an inboard side wall in front of the outlet oriented at a smaller angle to the direction of travel of the vehicle than the first portion of the rear wall.

2. Apparatus for reducing the amount of water spray produced by a wheel of a motor vehicle, comprising a mudguard extending round an upper part of the wheel, and a water collection chamber abutting the rear bottom edge of the mudguard and having an open front wider than the edge of the wheel, a rear wall having its outboard edge nearer to the front of the vehicle than its inboard edge, and an outlet located at the inboard side of the chamber inboard of the inboard edge of the wheel, a second portion of the rear wall extends from a first portion of the rear wall at a smaller angle to the direction of travel of the vehicle than the first portion of the rear wall.

3. Apparatus for reducing the amount of water spray produced by a wheel of a motor vehicle, comprising a mudguard extending round an upper part of the wheel, and a water collection chamber abutting the rear bottom edge of the mudguard and having an open front wider than the edge of the wheel, a rear wall having its outboard edge nearer to the front of the vehicle than its inboard edge, a top wall with its inboard edge higher than its outboard edge and an outlet located at the inboard side of the chamber inboard of the inboard edge of the wheel.

4. Apparatus according to claim 1, wherein the chamber has a bottom wall comprising a forward portion and a rearward portion, the rear edge of the rearward portion being lower than the front edge thereof.

5. Apparatus according to claim 1, wherein a deflector plate is attached to the front edge of the mudguard, the front edge of the deflector plate being above the rear edge thereof.

6. Apparatus according to claim 1, wherein a flap formed of flexible material is attached to the outboard edge of the mudguard.

7. Apparatus according to claim 1, wherein a flap formed of flexible material is attached to the inboard edge of the mudguard.

8. Apparatus according to claim 3, wherein the chamber has a bottom wall comprising a forward portion and a rearward portion, the rear edge of the rearward portion being lower than the front edge thereof.

9. Apparatus according to claim 3, wherein a deflector plate is attached to the front edge of the mudguard, the front edge of the deflector plate being above the rear edge thereof.

10. Apparatus according to claim 3, wherein a flap formed of flexible material is attached to the outboard edge of the mudguard.

11. Apparatus according to claim 3, wherein a flap formed of flexible material is attached to the inboard edge of the mudguard.

* * * * *